United States Patent
Singhal et al.

(10) Patent No.: US 12,484,061 B2
(45) Date of Patent: Nov. 25, 2025

(54) HARDWARE ASSISTED CHANNEL SWITCH TIME ENHANCEMENT

(71) Applicant: Avago Technologies International Sales Pte. Limited, Singapore (SG)

(72) Inventors: Kamal Agarwal Singhal, Bengaluru (IN); Bijoy Bhukania, Bengaluru (IN); Venkateswara Rao Kanchi, Bengaluru (IN); Varaprasad Javvadi, Bengaluru (IN); Swetank Ambar, Bengaluru (IN); Srikanth Gummadi, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 407 days.

(21) Appl. No.: 18/077,178

(22) Filed: Dec. 7, 2022

(65) Prior Publication Data
US 2024/0196401 A1   Jun. 13, 2024

(51) Int. Cl.
*H04W 72/20* (2023.01)
*H04L 69/323* (2022.01)

(52) U.S. Cl.
CPC ........... *H04W 72/20* (2023.01); *H04L 69/323* (2013.01)

(58) Field of Classification Search
CPC .............................. H04W 72/20; H04L 69/323
See application file for complete search history.

(56) References Cited

U.S. PATENT DOCUMENTS

| | | | |
|---|---|---|---|
| 8,856,282 B2 | 10/2014 | Kim et al. | |
| 11,212,279 B1* | 12/2021 | Levy-Abegnoli | ........................... H04L 63/0876 |
| 2007/0091813 A1 | 4/2007 | Richard et al. | |
| 2010/0302966 A1* | 12/2010 | Matsuura | .............. H04W 16/14 370/252 |
| 2011/0035522 A1 | 2/2011 | Tan et al. | |
| 2013/0258921 A1 | 10/2013 | Gevorkov et al. | |
| 2016/0174218 A1 | 6/2016 | Stanescu et al. | |
| 2016/0373979 A1 | 12/2016 | Dai et al. | |
| 2020/0137745 A1 | 4/2020 | Bachu et al. | |
| 2022/0060961 A1 | 2/2022 | Qi et al. | |

FOREIGN PATENT DOCUMENTS

| | | |
|---|---|---|
| CN | 101674631 A | 3/2010 |
| KR | 2007-0105653 A | 10/2007 |
| KR | 2021-0039448 A | 4/2012 |
| WO | WO-2018/031085 A1 | 2/2018 |

OTHER PUBLICATIONS

Extended European Search Report on EP Appln. No. 23213363.7 dated Jul. 15, 2024.

* cited by examiner

*Primary Examiner* — Zhiren Qin
(74) *Attorney, Agent, or Firm* — Foley & Lardner LLP

(57) ABSTRACT

Network devices may include shadowed parameters and duplicated algorithms, each of which being used to decrease channel switch time. A network device may use a controller to instruct various systems (MAC layer, PHY layer, and radio circuit) to create and store the shadowed parameters, which include channel-dependent parameters for each channel. The duplicated algorithms may be specific algorithms used for a particular channel. The shadowed parameters are pre-programmed and thus, do not require reprogramming prior to a channel switch operation. Additionally, the controller can instruction the MAC layer, the PHY layer and the radio circuit to cease operations prior to a channel switch operation.

21 Claims, 5 Drawing Sheets

HARDWARE ASSISTED CHANNEL SWITCH TIME ENHANCEMENT

TECHNICAL FIELD

This application is directed to wireless local area network (LAN) devices, and more particularly, to reducing channel switch times in a wireless LAN device.

BACKGROUND

Wireless LAN deploys multiple features in order to gain from switching/hopping across multiple radio channels. Typical channel switch delays are of the order of 5 milliseconds (ms). With stricter latency and throughput requirements, such switching delay presents itself as a limitation. For example, some network configurations are designed to operate on a fixed time slot in which channel switching occurs every 50 ms. Accordingly, 10% (or 5 ms) of the fixed time slot is attributed to the actual switching and is "lost" time. Other techniques operating on lower fixed time slot durations have a resultant higher percentage of lost time attributed to switching. Dynamic switching algorithms are not feasible with such large switching delays.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
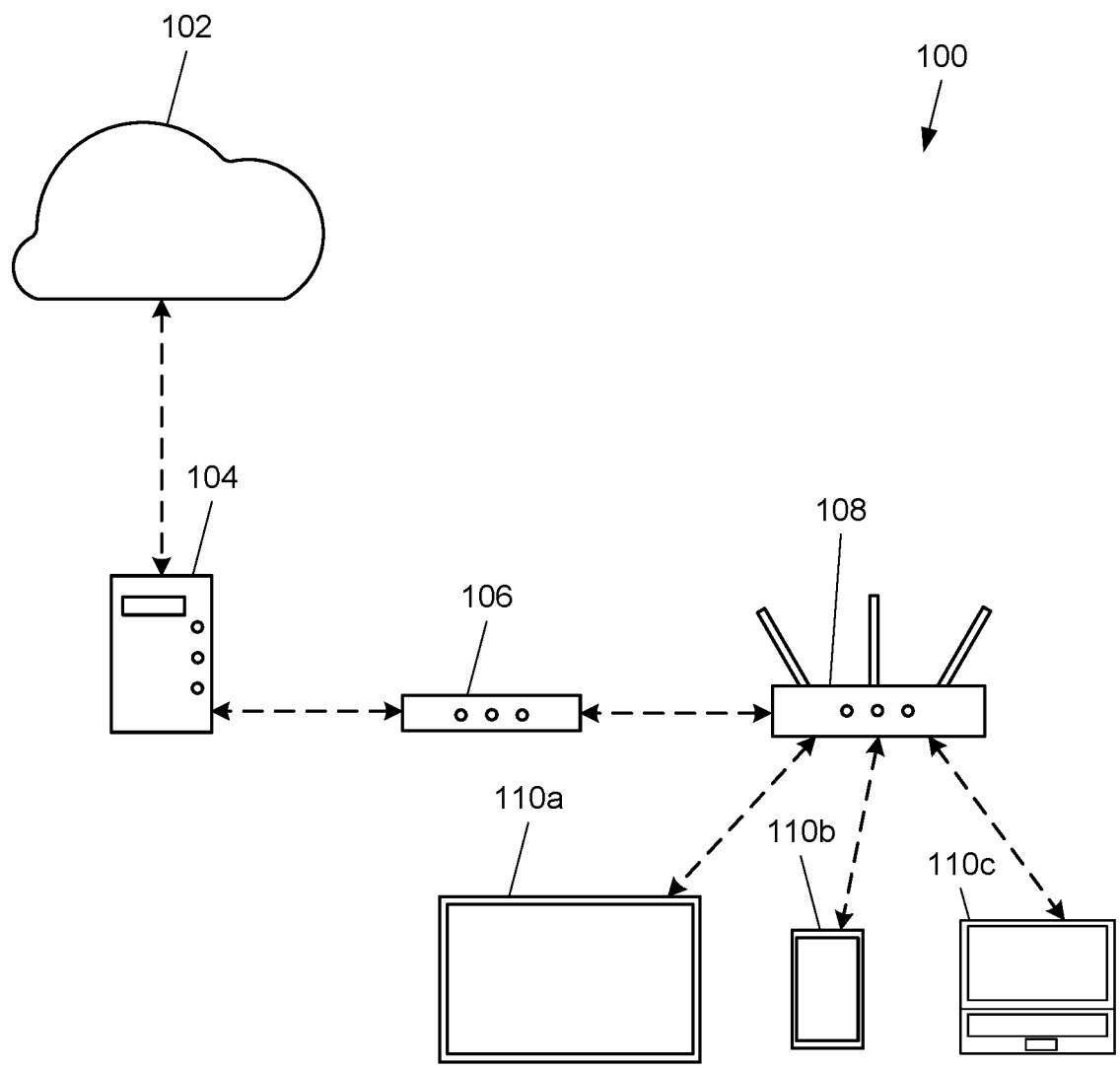
FIG. 1 illustrates an example environment that includes a wireless LAN device, in accordance with aspects of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is directed to modifications and enhancements to reduce channel switch times in network devices. Networking devices described herein may include access points used as part of a wireless computer network (e.g., wireless LAN) designed to link two or more devices using wireless communication to form a LAN for one or more client computing devices. During a channel switch operation, a device can switch from one channel to another channel in order to, for example, change the frequency or bandwidth, or to avoid interference. By reducing the channel switch time, the time dedicated to communication over the channel increases.

Network devices described herein may include a controller designed to shadow certain configuration parameters for each channel to which a network device can switch. The terms "shadow," "shadowed," or "shadowing" refer to a copy of configuration parameters that are made and stored on respective memory of interface layers (e.g., media access control (MAC) layer, physical layer (PHY layer)) or a radio circuit. Further, the shadowed configurations can be pre-programmed for each channel. The term "pre-programmed" or "pre-programming" as it relates to configuration parameter(s) refers to programming of the configuration parameters prior to a channel switch operation. Based on the pre-programming, at the time of a channel switch operation, the configuration parameters do not need to be programmed or re-programmed at the time of the channel switch operation. Additionally, some algorithms, or blocks, can be duplicated. For example, algorithms on the PHY layer can be duplicated for each channel to which a network device can switch, thereby allowing the algorithms to run independently for different channels without corrupting data of any one channel. Beneficially, the shadowing and duplicating techniques reduce time associated with channel switching. In some instances, the channel switch time is approximately in the range of 5-10 microseconds (µs).

Additionally, the controller (e.g., switch controller) can provide a reset command, or reset signal, to the various components of the network device. For example, prior to a channel switch operation, the controller can instruct the MAC layer, PHY layer, and radio circuit to cease or abandon any process currently running on the MAC layer, PHY layer, and radio circuit, respectively. This allows the MAC layer, PHY layer, and radio circuit to synchronize and arrive at a state in which each of the MAC layer, PHY layer, and radio circuit are prepared for a channel switch operation. Beneficially, the MAC layer, PHY layer, and radio circuit are not preoccupied with execution of other processes, thus further contributing to reduced channel switch time.

These and other embodiments are discussed below with reference to FIGS. 1-5. However, those skilled in the art will readily appreciate that the detailed description given herein with respect to these Figures is for explanatory purposes only and should not be construed as limiting.

According to some embodiments, for example as shown in FIG. 1, an environment 100 includes an internet 102 connected to a modem 104. The internet 102 may include a computer network or interconnected network using standardized communication protocols. The modem 104 is designed to receive information (e.g., electrical signals, optical signals) from the internet 102 and translate the information into readable/usable information for various devices. The modem 104 can also transmit information from the device back to the internet 102.

The environment 100 further includes a router 106 and a network device 108. The router 106 can communicate with the modem 104 and provide access to the internet 102 for various devices, including the network device 108. The network device 108 may include an access point designed to connect several client devices to a LAN, such as a client device 110a, a client device 110b, and a client device 110c. In this regard, the network device 108 may be referred to as a wireless LAN device. The client devices 110a, 110b, and 110c are exemplary client devices and may take the form of mobile wireless communication devices, laptop computing devices, and desktop computing devices, as non-limiting examples.

Figure 2:
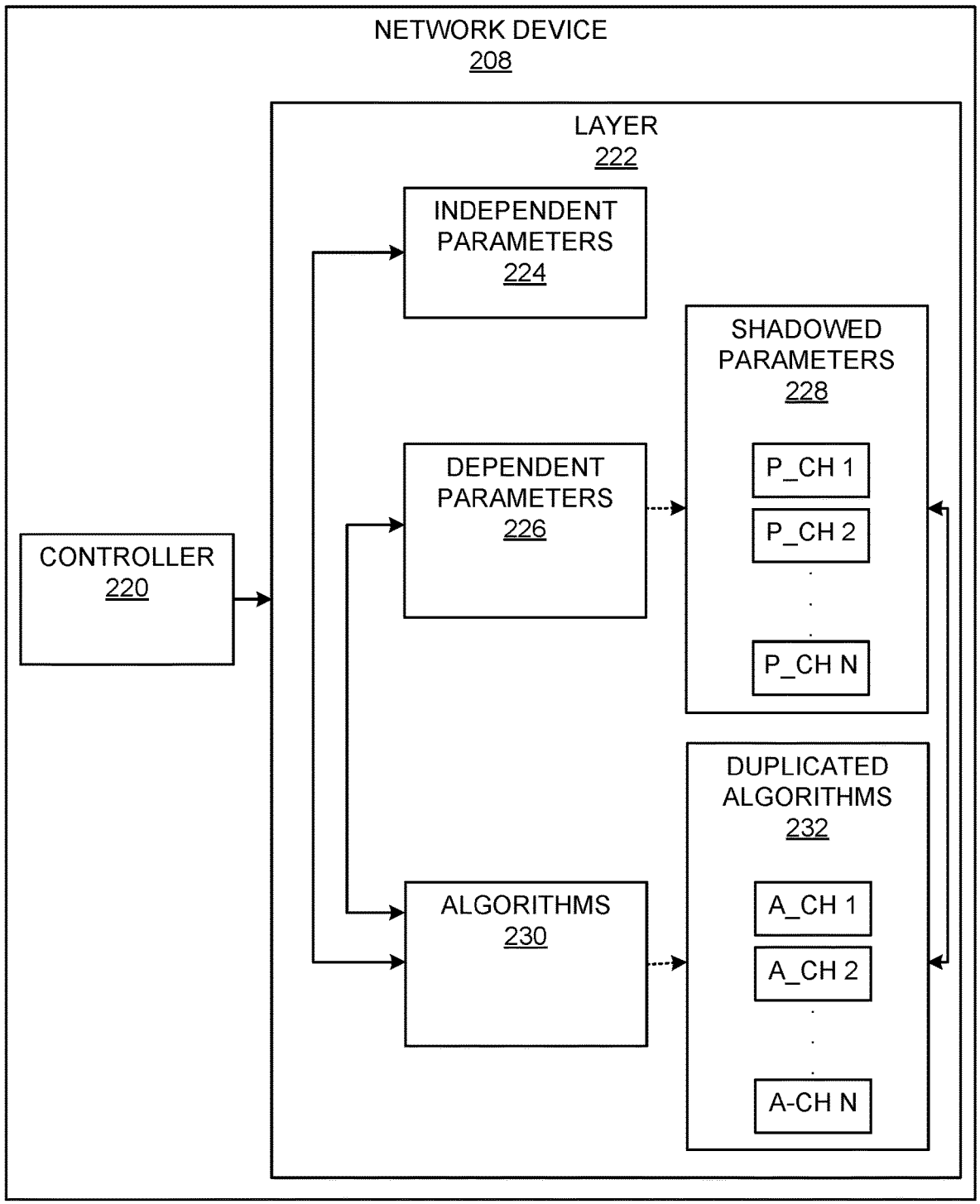
FIG. 2 illustrates a schematic diagram of a layer in a network device, in accordance with aspects of the present disclosure.

Referring to FIG. 2, a device 208 includes a controller 220 and a layer 222. The controller 220 (and other controllers shown and described herein) may be implemented as a switch controller. In some embodiments, the device 208 includes a network device or wireless LAN device, such as an access point. In some embodiments, the controller 220 is a programmable controller. In some embodiments, the layer 222 is an interface layer, such as a MAC layer or a PHY layer. A MAC layer may refer to an interface between a PHY layer and another layer (e.g., state machine, network layer). A PHY layer may refer to a layer that defines electrical and physical specifications for connected devices. In some embodiments, the layer 222 is a radio circuit. The controller 220 is designed to manage the layer 222 for a channel switch operation for the device 208.

The device 208 is designed to switch among N channels. In this regard, the layer 222 includes several parameters, thereby allowing the device 208 to operate and communicate on each of the channels. For example, the layer 222 includes independent parameters 224 and dependent parameters 226. The independent parameters 224 include channel-independent parameters, such as demodulation (DEMOD) parameters and filter coefficients, as non-limiting examples. The dependent parameters 226 include channel-dependent configuration parameters that are selected and used for a particular channel. As non-limiting examples, the dependent parameters 226 may include calibration parameters, bandwidth-dependent parameters (e.g., a clock rate), channel noise-related parameters, and transmit power limitation parameters.

The controller 220 can shadow the dependent parameters 226. Put another way, the controller 220 can create a copy of the dependent parameters 226 or instruct the layer 222 to create the copies. As shown, the shadowed parameters 228 include configuration parameters for Channel 1 ("P_CH 1") through Channel N ("P_CH N"), i.e., a copy for each of the N channels. Prior to a channel switch operation, the shadowed parameters 228 can be pre-programmed configuration parameters such that when the channel switch operation is initialized, each of the shadowed parameters 228 is prepared to switch to a particular, assigned channel of the N channels based upon a command or request to switch to the particular channel.

Additionally, the layer 222 include algorithms 230, or blocks, designed to execute instructions, or run, for each of the N channels. As shown, the algorithms 230 include algorithms for Channel 1 ("A_CH 1") through Channel N ("A_CH N"), i.e., a copied set of channel-dependent configuration parameters for each of the N channels. As non-limiting examples, the algorithms 230 may include tracking algorithms, statistical collection algorithms, and application-specific algorithms (e.g., an algorithm used for a particular channel). Also, the algorithms 230 can be duplicated to form duplicated algorithms 232. The duplicated algorithms 232 include algorithms for Channel 1 ("A_CH 1") through Channel N ("A_CH N"), i.e., a copied set of algorithms, with one set designed to run for each of the N channels. The duplicated algorithms 232 can run differently for different channels (of the N channels) without corrupting data on other channels. Further, some of the duplicated algorithms 232 can be tracked separately for different channels. Based the selected channel, the duplicated algorithms 232 can select an appropriate set of algorithms as well as corresponding, appropriate set of shadowed parameters 228.

Figure 3:
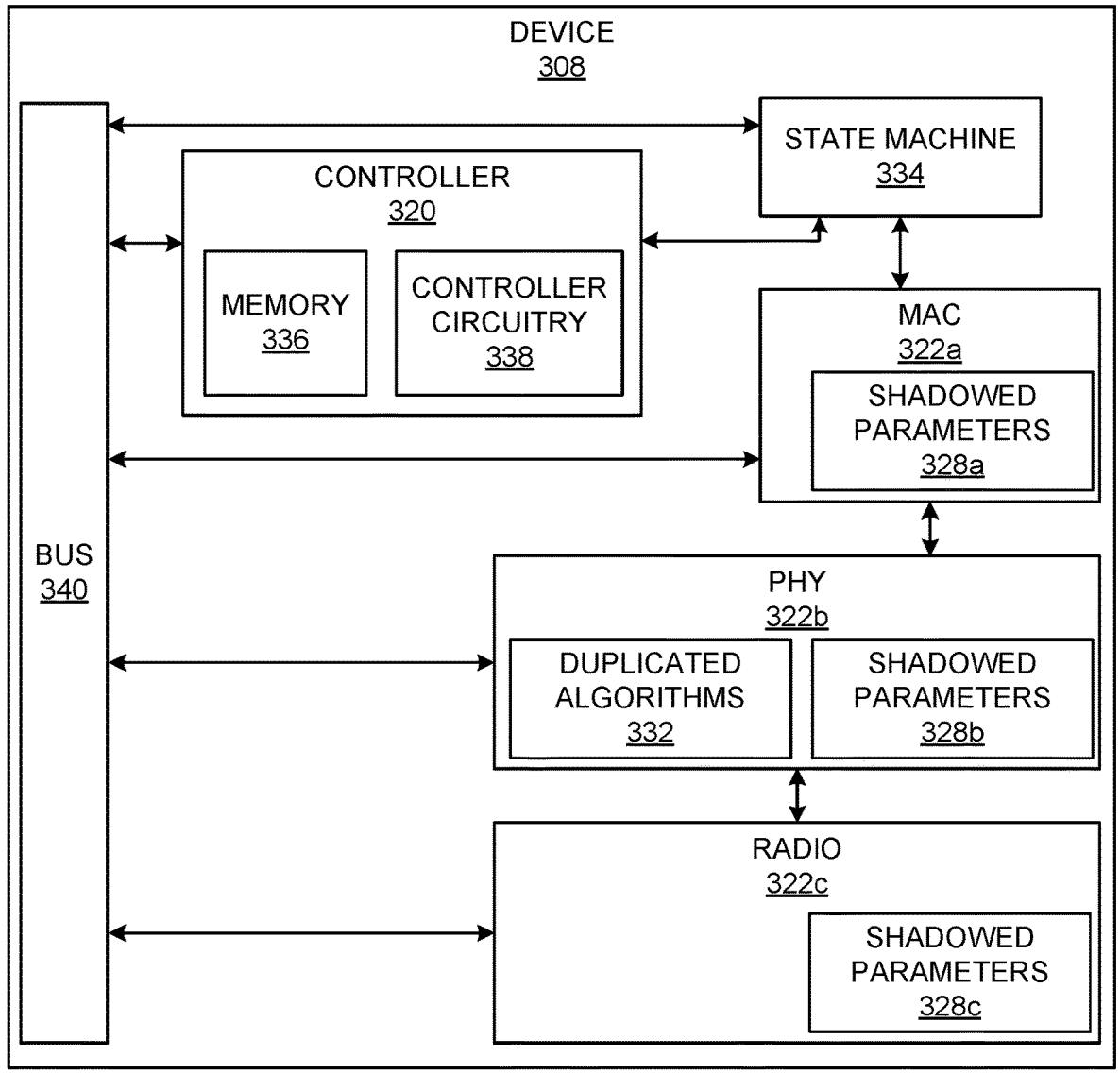
FIG. 3 illustrates a schematic diagram of a network device, in accordance with aspects of the present disclosure.

Referring to FIG. 3, a device 308 includes a controller 320 used to switch among several channels. In some embodiments, the device 308 includes a network device or wireless LAN device, such as an access point. The device 308 further includes a state machine 334. In some embodiments, the state machine 334 is a master state machine designed to determine when a channel switch operation is to be performed, and instruct other systems (e.g., controller 320) to initiate and carry out the channel switch operation. Varies features implemented by the device 308 may dictate when a channel switch operation occurs. Such exemplary features include virtual simultaneous dual band (VSDB), Apple wireless direct link (AWDL), neighborhood area network (NAN), and eMLSR (enhanced multi-link single radio). Also, in some embodiments, the state machine 334 switches from one channel to another channel based upon a specified condition (e.g., selection of a random backup channel). In some embodiments, the state machine 334 periodically switches from one channel to another channel (e.g., every 50 ms). Accordingly, the controller 320 can instruct either of the MAC layer 322a, a PHY layer 322b, and a radio circuit 322c to perform a channel switch operation based upon a certain condition or periodically perform a channel switch operation.

In some embodiments, the controller 320 is a programmable controller. As shown, the controller 320 includes a memory 336 (e.g., read-only memory and/or random-access memory) that stores executable instructions. The executable instructions may include steps used to carry out a channel switch operation described herein. Also, while the memory 336 is shown as being integrated with the controller 320, the memory 336 may be stored externally with respect to the controller 320. The controller 320 may further include controller circuitry 338. The controller circuitry 338 may include a MEMS controller, an application-specific integrated circuit, and/or one or more microcontrollers, as non-limiting examples. The controller circuitry 338 is operatively coupled to the memory 336, and as a result, can receive the instructions stored on the memory 336.

The device 308 further includes a MAC layer 322a, a PHY layer 322b, and a radio circuit 322c. The MAC layer 322a is designed to interface with the state machine 334 and the PHY layer 322b, while the PHY layer 322b acts as an interface between the MAC layer 322a and the radio circuit 322c. The radio circuit 322c is designed to exchange (e.g., transmit and receive) information in the form of radio frequencies (RF) between the device 308 and other devices in communication with the device 308. The exchanged information may be in accordance with one or more wireless communication protocols. The RF exchange by the radio circuit 322c can be divided into a number of frequency ranges, or bands. Further, the radio circuit 322c may enable RF communication ranging from 2.4 Gigahertz (GHz) to 60 GHz.

Each of the MAC layer 322a, the PHY layer 322b, and the radio circuit 322c may include any features shown and described for the layer 222 (shown in FIG. 2). In this regard, the MAC layer 322a, the PHY layer 322b, and the radio circuit 322c include shadowed parameters 328a, shadowed parameters 328b, and shadowed parameters 328c, respectively. Each of the shadowed parameters 328a, the shadowed parameters 328b, and the shadowed parameters 328c represented copies of pre-programmed, channel-dependent configuration parameters for the MAC layer 322a, the PHY layer 322b, and the radio circuit 322c, respectively. The controller 320 may be used to generate the shadowed parameters 328a, 328b, and 328c.

Further, each of the MAC layer 322a, the PHY layer 322b, and the radio circuit 322c may include duplicate algorithms designed to run differently for different channels without corrupting data on other channels. For example, the PHY layer 322b includes duplicated algorithms 332. Although not shown, the MAC layer 332a and/or the radio circuit 332c may each include duplicated algorithms. For purposes of illustration, the device 308 is designed to switch among N channels. In this regard, the shadowed parameters 328a, the shadowed parameters 328b, and the shadowed parameters 328c include N copied parameters (for each of the N channels), and the duplicate algorithms 332 includes N duplicated sets of algorithms (for each of the N channels).

Also, the device 308 further includes a bus 340. The described systems can communicate with each other via the bus 340. Accordingly, the bus 340 acts as a communication system that transfers data among the system and components of the device 308.

In an exemplary operation, the state machine 334 provides a command to the controller 320 to switch from Channel 1 to Channel 7, with Channels 1 and 7 being two of the N channels. The controller 320 provides, from the channel switch command, information to the MAC layer 322a, the PHY layer 322b, and the radio circuit 322c that enables the MAC layer 322a, the PHY layer 322b, and the radio circuit 322c to identify and access, from the shadowed parameters 328a, the shadowed parameters 328b, and the shadowed parameters 328c, respectively, the proper configuration parameters to undergo a channel switch to Channel 7. Moreover, the controller 320 provides, from the channel switch command, information the PHY layer 322b that enables the PHY layer 322b to identify and access, from the duplicated algorithms 332, the proper algorithms to undergo a channel switch to Channel 7. Accordingly, the channel switch command provided by the controller 320 provides the information that causes the MAC layer 322a, the PHY layer 322b, and the radio circuit 322c to select the correct shadowed parameters from the shadowed parameters 328a, 328b, and 328c, respectively. The "correct shadowed parameters" refer to the channel-dependent configuration parameters specific to the new channel, i.e., the channel to which the channel switch operation will switch. Additionally, it should be noted that the channel switch command provided by the controller 320 provides the information that causes the PHY layer 322b to select the correct algorithms from the duplicated algorithms 332. The "correct duplicated algorithms" refer to the algorithms(s) that work with, and are adapted to, the new channel, i.e., the channel to which the channel switch operation will switch.

Additionally, in some embodiments, a clock rate may change based on the bandwidth requirements. For example, in some embodiments, one subset of channels operates at 5 GHz and another subset of channels operates at 60 GHz. The clock parameters can be changed accordingly to accommodate the updated operating frequency when the channels switches from subset of channels with different operating frequencies.

Based on the pre-programing and storing of the shadowed parameters 328a, the shadowed parameters 328b, and the shadowed parameters 328c, there is no additional reprogramming requirements to operate on Channel 7. Moreover, prior to commencing the channel switch operation, the controller 320 may generate and send a reset command to each of the MAC layer 322a, the PHY layer 322b, and the radio circuit 322c. The reset command causes the MAC layer 322a, the PHY layer 322b, and the radio circuit 322c to cease performance of or abandon one or more operations currently running on the MAC layer 322a, the PHY layer 322b, and the radio circuit 322c, respectively. Beneficially, the MAC layer 322a, the PHY layer 322b, and the radio circuit 322c are not occupied by running the now ceased operations are in a waiting mode, thus allowing the MAC layer 322a, the PHY layer 322b, and the radio circuit 322c to await and prepare for a channel switch command. Beneficially, the described enhancements can reduce channel switch times to approximately 5-10 μm.

Figure 4:
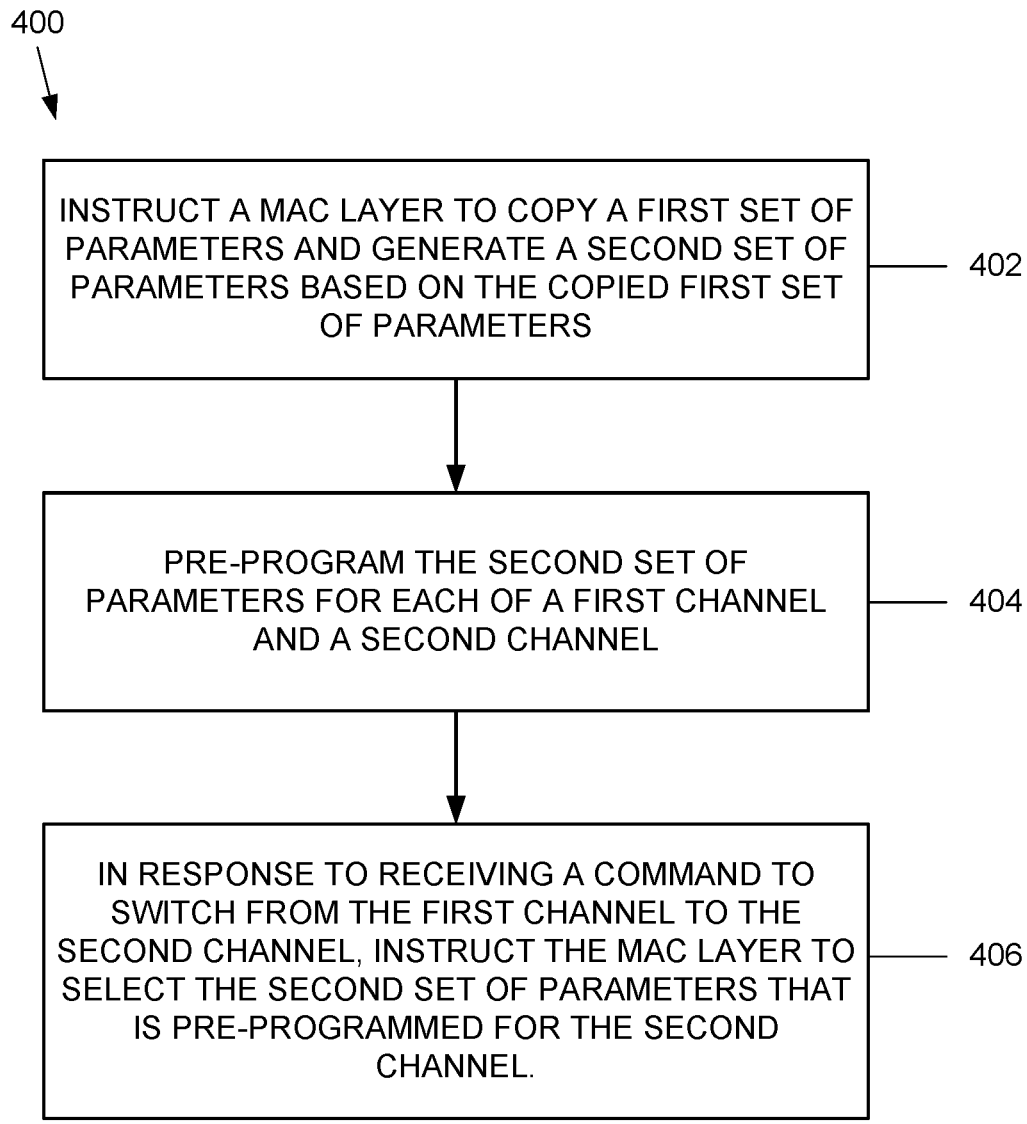
FIG. 4 illustrates a flowchart showing a method for channel switching, in accordance with aspects of the present disclosure.

Referring to FIG. 4, a flowchart showing a method 400 for channel switching from a first channel to a second channel is shown. The steps of the method 400 may be carried out by a controller of a device (e.g., network device). In addition to the controller, the device may further include a state machine, a MAC layer, a PHY, and a radio circuit.

In step 402, the MAC layer is instructed to copy a first set of parameters and generate a second set of parameters based on the copied first set of parameters. The first set of parameters may include shadow parameters that include a copy of configuration parameters, representing a second set of parameters. The copy of configuration parameters may include channel-dependent configuration parameters, as a non-limiting example.

In step 404, the second set of parameters is pre-programmed for each of a first channel and a second channel. By pre-programming the configuration parameters, the copied shadow parameters are prepared, without reprogramming, to operate on the new (second) channel.

In step 406, in response to receiving a command to switch from the first channel to the second channel, the MAC layer is instructed to select the second set of parameters that are pre-programmed for the second channel. Additionally, prior to the MAC layer selecting the second set of parameters for the second channel, the MAC layer may be instructed to cease, or terminate, operation, thereby allowing the MAC layer to be ready for a channel switch operation.

In some embodiments, the method 400 proceeds from step 404 to step 406 based on a command received from the state machine to switch from the first channel to the second channel. The state machine provides instructions to the controller, which indicate a channel switch operation from the first channel to the second channel is to be performed.

Figure 5:
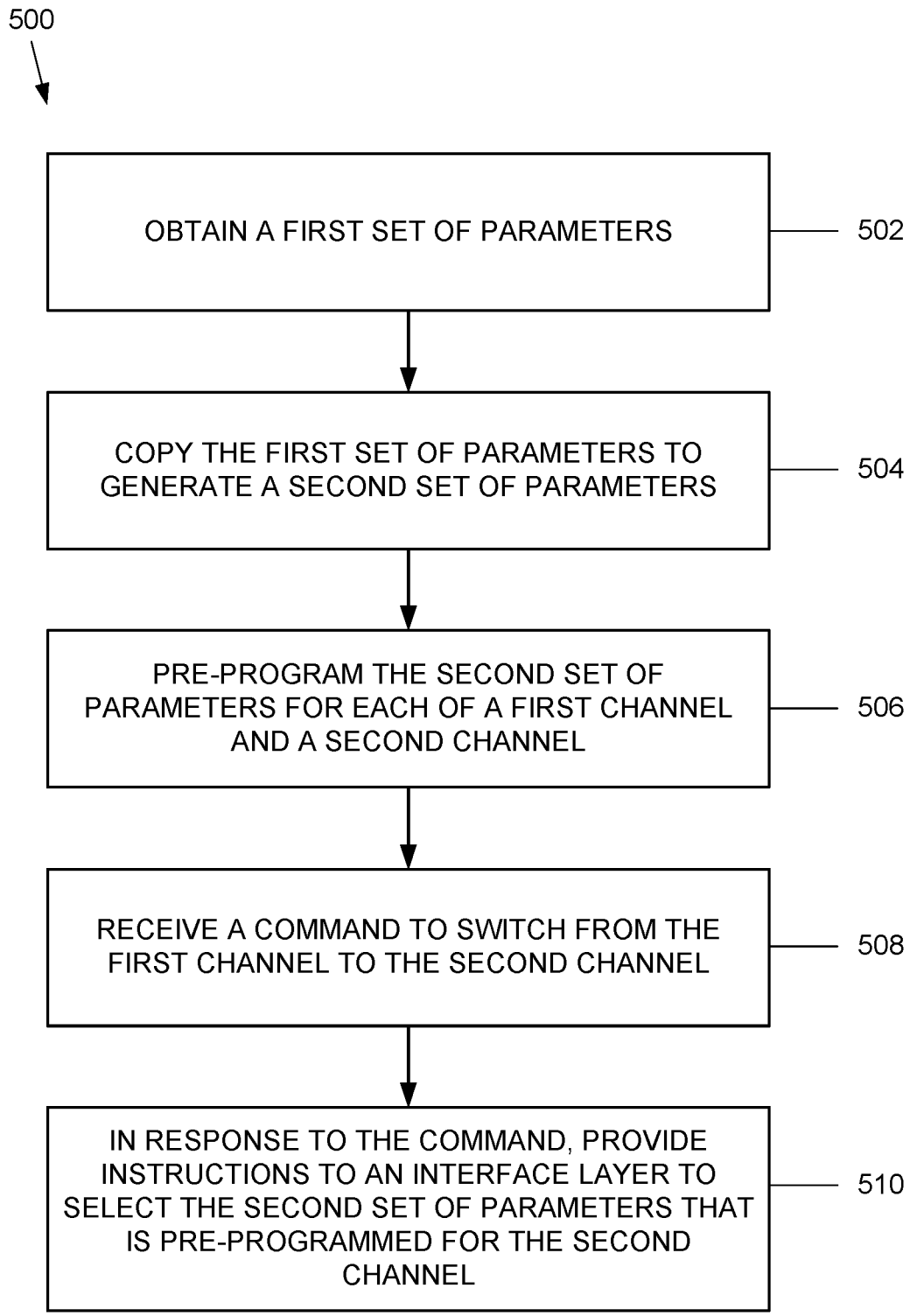
FIG. 5 illustrates an additional flowchart showing a method for channel switching, in accordance with aspects of the present disclosure.

Referring to FIG. 5, a flowchart showing a method 500 for channel switching from a first channel to a second channel is shown. The steps of the method 500 may be carried out by a controller of a network device. In addition to the controller, the network device may further include a state machine, one or more interface layers (e.g. a MAC layer, a PHY) and a radio circuit.

In step 502, a first set of parameters is obtained. In some embodiments, the first set of parameters includes dependent parameters, such as calibration parameters, bandwidth-dependent parameters (e.g., a clock rate), channel noise-related parameters, and transmit power limitation parameters, as non-limiting examples.

In step 504, the first set of parameters is copied to generate a second set of parameter. The second set of parameter may represent shadowed parameters that include a copy of configuration parameters. The second set of parameters may include channel-dependent configuration parameters, as non-limiting examples.

In step 506, the second set of parameters is pre-programmed for each of a first channel and a second channel. By pre-programming the second set of parameters, the copied shadow parameters are prepared, without reprogramming, to operate on the second channel.

In step 508, a command is received to switch from the first channel to the second channel. In some embodiments, the state machine initiates the command to the controller.

In step 510, in response to the command, an interface layer receives instructions to select the second set of parameters that are pre-programmed for the second channel.

Various examples of aspects of the disclosure are described below as clauses for convenience. These are provided as examples, and do not limit the subject technology.

One or more of the above clauses can include one or more of the features described below. It is noted that any of the following clauses may be combined in any combination with each other, and placed into a respective independent clause, e.g., clause A, B, or C.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A controller, comprising:
    a memory that stores instructions; and
    controller circuitry coupled to the memory, wherein executing the instructions causes the controller circuitry to:
        instruct a machine access control (MAC) layer to copy a first set of parameters and generate a second set of parameters based on the copied first set of parameters,
        pre-program the second set of parameters for each of a first channel and a second channel, and
        in response to receiving a command to switch from the first channel to the second channel, instruct the MAC layer to select the second set of parameters that is pre-programmed for the second channel.

2. The controller of claim 1, wherein executing the instructions further causes the controller circuitry to:
    instruct a physical (PHY) layer to copy a third set of parameters and generate a fourth set of parameter based on the copied third set of parameters,
    pre-program the fourth set of parameters for each of the first channel and the second channel, and
    in response to receiving the command, instruct the PHY layer to select the fourth set of parameters that are pre-programmed for the second channel.

3. The controller of claim 2, wherein executing the instructions further causes the controller circuitry to instruct the PHY layer to select a set of duplicated algorithms stored on the PHY layer, wherein the set of algorithms operate the second channel.

4. The controller of claim 2, wherein executing the instructions further causes the controller circuitry to:
  instruct a radio circuit to create a fifth set of parameters and generate a sixth se of parameters based on the copied fifth set of parameters,
  pre-program the sixth set of parameters for each of the first channel and the second channel, and
  in response to receiving the command, instruct the radio circuit to select the sixth set of parameters that are pre-programmed for the second channel.

5. The controller of claim 2, wherein:
  executing the instructions further causes the controller circuitry to, prior to instructing the MAC layer and the PHY layer, provide a command to the MAC layer and the PHY layer, and
  the MAC layer and the PHY layer cease operation and await the instructions in response to the controller circuitry providing the command.

6. The controller of claim 1, wherein executing the instructions further causes the controller circuitry to receive the command from a state machine.

7. The controller of claim 1, wherein executing the instructions further causes the controller circuitry to instruct the MAC layer to select channel-dependent parameters specific to the second channel.

8. The controller of claim 7, wherein executing the instructions further causes the controller circuitry to instruct the MAC layer to select bandwidth-dependent parameters for the second channel.

9. The controller of claim 1, wherein executing the instructions further causes the controller circuitry to instruct the MAC layer to initiate a channel switch operation based upon a specified condition.

10. The controller of claim 1, wherein executing the instructions further causes the controller circuitry to instruct the MAC layer to periodically perform a channel switch operation.

11. The method of claim 1, wherein the interface layer is a machine access control (MAC) layer.

12. A method for managing a channel switching operation, the method comprising:
  obtaining a first set of parameters;
  using the first set of parameters to generate a second set of parameters;
  pre-programming the second set of parameters for each of a first channel and a second channel;
  receiving a command to switch from the first channel to the second channel; and
  in response to the command, providing instructions to an interface layer to select the second set of parameters that is pre-programmed for the second channel.

13. The method of claim 12, further comprising, prior to providing the instructions, providing a command to the interface layer, wherein the interface layer ceases operation and awaits the instructions based on the command.

14. The method of claim 12, wherein obtaining the first set of parameters comprises:
  obtaining a first set of channel-dependent configuration parameters specific to the first channel; and
  obtaining a second set of channel-dependent configuration parameters specific to the second channel.

15. A system comprising:
  circuitry configured to:
    instruct a machine access control (MAC) layer to use a first set of parameters to generate a second set of parameters based at least on the first set of parameters,
    program the second set of parameters for each of a first channel and a second channel, and
    in response to receiving a command to switch from the first channel to the second channel, instruct the MAC layer to select the second set of parameters that is programmed for the second channel.

16. The system of claim 15, wherein the circuitry is further configured to instruct the MAC layer to select channel-dependent parameters specific to the second channel.

17. The system of claim 15, wherein the circuitry is further configured to instruct the MAC layer to select channel-dependent parameters specific to the second channel.

18. The system of claim 15, wherein the circuitry is further configured to instruct the MAC layer to initiate a channel switch operation based upon a specified condition.

19. The system of claim 15, wherein the circuitry is further configured to instruct the MAC layer to periodically perform a channel switch operation.

20. The system of claim 15, wherein the circuitry is further configured to instruct a physical (PHY) layer to use a third set of parameters to generate a fourth set of parameter based at least on the third set of parameters,
  program the fourth set of parameters for each of the first channel and the second channel, and
  in response to receiving the command, instruct the PHY layer to select the fourth set of parameters that are programmed for the second channel.

21. The system of claim 15, wherein the circuitry is further configured to instruct a physical (PHY) layer PHY layer to select a set of algorithms stored on the PHY layer, wherein the set of algorithms to operate the second channel.

* * * * *